(12) United States Patent
Redondo Bonaldi et al.

(10) Patent No.: US 10,344,143 B2
(45) Date of Patent: Jul. 9, 2019

(54) METHOD FOR PROVIDING RESISTANCE TO YELLOWING IN POLYAMIDE ARTICLES AND POLYAMIDE ARTICLES OBTAINED FROM THIS METHOD

(71) Applicant: RHODIA POLIAMIDA E ESPECIALIDADES S.A., San Paulo (BR)

(72) Inventors: Renata Redondo Bonaldi, São Paulo (BR); Gabriel Gorescu, São Paulo (BR); Thomas Gonzaga Canova, São Paulo (BR); Everton Ferreira Dos Santos, São Paulo (BR)

(73) Assignee: RHODIA POLIAMIDA E ESPECIALIDADES S.A., Sao Paulo (BR)

( * ) Notice: Subject to any disclaimer, the term of this patent is extended or adjusted under 35 U.S.C. 154(b) by 202 days.

(21) Appl. No.: 15/532,629

(22) PCT Filed: Oct. 1, 2015

(86) PCT No.: PCT/IB2015/001764
§ 371 (c)(1),
(2) Date: Jun. 2, 2017

(87) PCT Pub. No.: WO2016/087913
PCT Pub. Date: Jun. 9, 2016

(65) Prior Publication Data
US 2017/0335087 A1  Nov. 23, 2017

(30) Foreign Application Priority Data
Dec. 3, 2014  (WO) .................. PCT/IB2014/002653

(51) Int. Cl.
| C08K 5/42 | (2006.01) |
| C08G 69/28 | (2006.01) |
| D01F 1/10 | (2006.01) |
| D01F 6/60 | (2006.01) |
| C08G 69/16 | (2006.01) |
| C08L 77/02 | (2006.01) |
| C08L 77/06 | (2006.01) |

(52) U.S. Cl.
CPC ................ C08K 5/42 (2013.01); C08G 69/16 (2013.01); C08G 69/28 (2013.01); C08L 77/02 (2013.01); C08L 77/06 (2013.01); D01F 1/10 (2013.01); D01F 6/60 (2013.01); D10B 2331/02 (2013.01)

(58) Field of Classification Search
CPC . C08K 5/42; C08L 77/06; C08L 77/02; D01F 6/60; D01F 1/10; C08G 69/28; C08G 69/16
See application file for complete search history.

(56) References Cited

U.S. PATENT DOCUMENTS

| 2005/0183216 A1* | 8/2005 | Harriss .................. A41C 3/142 8/555 |
| 2011/0155948 A1* | 6/2011 | Namkung ............... C08L 77/00 252/74 |
| 2011/0196093 A1* | 8/2011 | Ortiz ...................... C08G 69/04 525/52 |

OTHER PUBLICATIONS

ASTM E313 Standard Practice for Calculating Yellowness and Whiteness Indices from Instrumentally Measured Color Coordinates, Jun. 2015. (Year: 2015).*

* cited by examiner

Primary Examiner — Christopher M Rodd

(57) ABSTRACT

The present invention relates to a method for providing resistance to phenolic yellowing, during storage, transportation and processing of polyamide articles, caused by the presence of phenolic compounds in plastic package materials. The phenolic yellowing resistance is obtained by adding a sulfonated reagent during polymerization of the polyamide and/or during the formation of the polyamide article, like melt-spinning extrusion, and/or during the conversion of the polyamide article by texturizing.

20 Claims, No Drawings

METHOD FOR PROVIDING RESISTANCE TO YELLOWING IN POLYAMIDE ARTICLES AND POLYAMIDE ARTICLES OBTAINED FROM THIS METHOD

This application is a U.S. national phase entry under 35 U.S.C. § 371 of International Application No. PCT/IB2015/001764, filed Oct. 1, 2015, which claims priority to PCT/IB2014/002653 filed on Dec. 3, 2014. The entire content of each of these applications is hereby incorporated herein by reference.

FIELD OF THE INVENTION

The present invention generally relates to a method for providing resistance to yellowing in polyamide articles during storage. More specifically, the present invention describes a method for obtaining phenolic yellowing-proof white polyamide articles like fibers, yarns, filaments and textile articles made therefrom, by adding a sulfonated reagent during polymerization and/or during the formation of polyamide article from a molten polyamide, like melt-spinning extrusion, and/or during the conversion of the polyamide article by texturizing.

PRIOR ART

The commercial interest in polyamides, particularly based on fibers and yarns used in textile goods such as underwear, sportswear, leisurewear and nightwear, has been extensively increased because of theirs, advantages in this field, like easy-care, fast-drying properties, high durability, abrasion resistance, balanced moisture absorption, good elasticity, lightness, comfort and softness. However, polyamide fibers typically suffer from a lack of resistance to yellowing caused during storage and transportation of the textile.

Various studies have explained the yellowing phenomenon. According to Döffier, C (DÖRFLER, C. Yellowing on polyamide: Reasons and prevention. Melliand International. September 2008, Vol. 14, No. 4 pages 248-250), the storage yellowing is more precisely phenolic yellowing, caused by the reaction of nitrogen oxides, among other gases from the air, with phenolic substances present in storage and transportation materials. Indeed, phenolic substances are used as antioxidants in packaging materials, like films, foams and adhesives.

Plastic packaging material, like polyethene, contains butylated hydroxy toluene (BHT) as antioxidant and anti-ageing preservative. This antioxidant agent (BHT) in the polyethene sheets causes the appearance of a yellow color in the polyamide article in contact with the sheet, when exposed to environmental nitrogen oxide gases ($NO_x$) from sources such as air pollution, tow motor emissions, and gas furnaces. This interaction produces the compound named 2,6-di-tert-butyl-4-nitrophenol (DTNP), the main source of phenolic yellowing, according to the following steps described in Amarelamento corn antioxidants. Quimica Têxtil. September 2005, No. 80 pages 28-35.

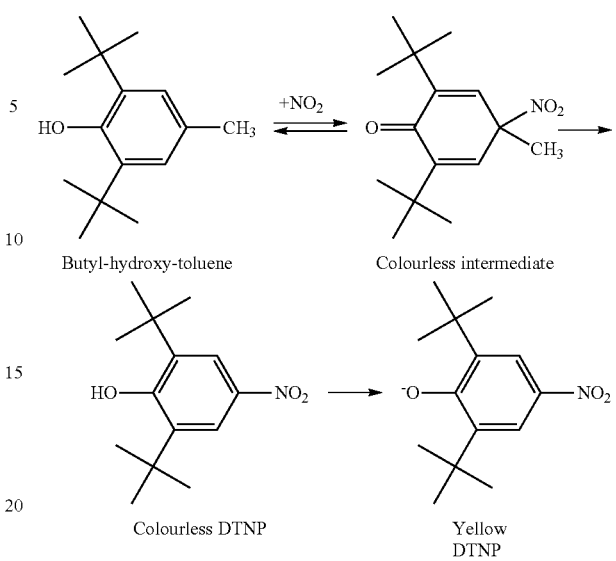

Butyl-hydroxy-toluene     Colourless intermediate

Colourless DTNP     Yellow DTNP

The amino end groups (NH2) of the polyamide react with the Colourless DTNP by capturing the hydrogen atom from the OH group of the Colourless DTNP, forming a polyamide $NH_3^+$ end group. The resulting DTNP becomes ionized and turns into yellow, thereby causing the yellowing in the polyamide article.

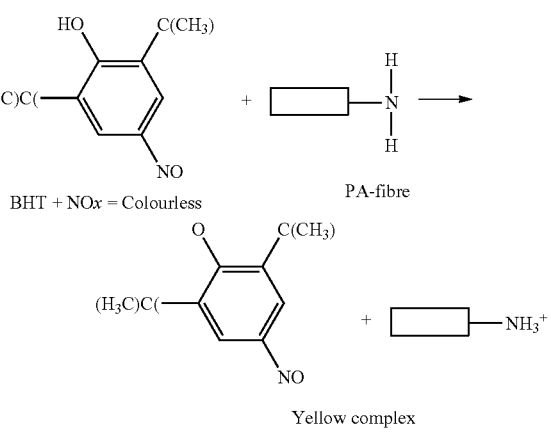

BHT + NOx = Colourless     PA-fibre

Yellow complex

According to Litherland, A (LITHERLAND, A, and YOUNG, T C. Phenolic yellowing of textiles during storage. Part 1—Occurrence, characterization and causes. JSDC. July/August 1983 Vol. 99, pages 201-207), yellowing of textile materials during storage is a common problem and many different chemical mechanisms may be involved, depending on the nature of the textiles, dyes, finishes, packaging materials and possible contaminating substances. Besides that, the manuscript also describes that one method of preventing yellowing might be to avoid residual alkalinity in the fabric from which the garments are made.

Residual alkalinity is common in textile treatments and is due to external chemical compounds used in dyeing, bleaching, scouring, and finishing, but is unrelated to the amino end groups present in the polyamide structure. Avoiding residual alkalinity is sufficient to promote non-yellowing of textile articles such as cotton and polyester, but it does not prevent phenolic yellowing in polyamide during storage.

Even if residual alkalinity caused by external compounds is avoided, the "intrinsic" phenolic yellowing due to the direct contact between the polyamide and the storage material containing BHT is still observed.

Furthermore, the use of chemicals containing phenolic compounds during processing of the polyamide may also increase the propensity to phenolic yellowing in polyamide articles during storage and transportation. Examples of chemicals that are applied to polyamide during processing and may contain phenolic compounds are antioxidants, lubricants, softening agents, spin-finishes, processing aids and additives.

This type of intrinsic phenolic yellowing of polyamide constitutes a new challenge for the textile industry.

The most common approach to counteract this problem is to treat the textile fabric and articles with aryl alkyl sulfonic acid salts during impregnation and exhaustion finishing treatments, as illustrated by U.S. Patent Application Publication 2009/0249555. The drawbacks of this approach are the need of an additional processing step, involving high consumption of water, energy and time, which significantly increases the costs and affect the environment. An additional disadvantage of this approach is the fact that the polyamide yarn itself is not protected in the previous stages of the manufacturing chain, such as the formation, processing, storage and transport of the polyamide yarns, before the formation of the fabric.

Another approach described in WO 2011/076085, is to add around 0.7% of dicarboxylic anhydride, as succinic anhydride, during the extrusion stage of the polyamide fiber. However, the use of this kind of reagent affects the extrusion processing conditions because they cause a significant drop in the viscosity of the polymer, by reducing the molecular weight and releasing water molecules. Furthermore, special conditions of drying and vacuum are needed in order to improve processability. Last but not least, the above document is intended for dyeable textile articles, for which the requirements in terms of yellowing proof are lower than the ones necessary for the white polyamide fibers. Indeed, dyed polyamides are less prone to yellowing because generally less amino groups are present (when dyed with acidic dyes) and the color masks the yellowing.

A further radical solution to overcome the yellowing problem would be replacing the phenol antioxidants used in the packaging materials by non-phenol counterparts. However, this alternative is unlikely to happen due to the extremely high costs involved in replacing the antioxidants. This solution also belongs to the downstream manufacturers, hence out of the control of the textile industry.

The U.S. Patent Application Publication 2011/0196093 discloses a method of polymerizing a monomer to form a polyamide having a sulfoisophthalic acid incorporated therein. This sulfoisophthalic acid is used as a stain blocking agent to increase stain resistance of articles formed from polyamide, through improving the washing ability to remove stains coming from, for example, wine and coffee. The easier removal is accomplished during home-washing treatments. The source of the stain here is not the presence of BHT compound in packaging material in contact with the polyamide, and is thus different from phenolic yellowing. Besides that, the above document is intended for dyeable textile articles, for which the requirements in terms of yellowing proof are lower than the ones necessary for the white polyamide fibers.

The U.S. Pat. No. 3,846,507 discloses a process for producing a fibre forming polyamide having improved basic dye receptivity and reduced acid dye receptivity either by melt polymerizing sodium 3,5-benzenedicarboxylic acid sulfonate with monomers of polyamide or by melt extruding a polyamide containing this sodium 3,5-benzenedicarboxylic acid sulfonate with a virgin polyamide. The intended application is clearly dyeable yarns that do not have the same specificities as white fibers as explained above.

In view of the above, there is still a need to propose a method for providing resistance to yellowing in polyamide articles, that are not intended to be dyed (white polyamide articles), for which the yellowing-proof requirement is higher. Dyed polyamide articles have almost half of the original amino end groups already blocked by the acid dye, which reduces significantly the tendency to phenolic yellowing.

Indeed, there is no existing solution to avoid phenolic yellowing due to the direct contact of polyamide with plastic packaging material, containing phenolic compounds like butylated hydroxytoluene (BHT), before the formation of the polyamide fabric and articles. The only existing methods prevent yellowing coming from residual alkalinity of external compounds but are not applicable to polyamide or involve additional process steps that decrease processability. The solution provided by the present invention is, in addition, cost-effective and environmental friendly as it avoids the high consumption of water, time and energy associated with textile treatments and waste treatments normally found in the industry.

BRIEF DESCRIPTION OF THE INVENTION

In view of the above, the present invention provides a method for providing resistance to phenolic yellowing in white polyamide articles subject to contact with plastic packaging material containing phenolic compounds, like butylated hydroxytoluene (BHT). Said method comprises at least the following steps:
  a. Polymerization of at least a monomer to obtain a polyamide in a melt, pellet or powder form,
  b. Formation of the polyamide article from the polyamide melt, pellet or powder, wherein a sulfonated reagent is introduced during step a. and/or b,
  c. Optionally conversion of the polyamide article using texturizing process,
the sulfonated reagent being introduced during step a. and/or b, and/or c, in order to provide resistance to phenolic yellowing to the obtained white polyamide article when it is in contact with plastic packaging material containing phenolic compounds, like butylated hydroxytoluene (BHT).

In other words, the invention consists in the use of a sulfonated reagent in a process for producing a white polyamide article that comprises at least the following steps:
  a. Polymerization of at least a monomer to obtain a polyamide in a melt, pellet or powder form,
  b. Formation of the polyamide article from the polyamide melt, pellet or powder,
  c. Optionally conversion of the polyamide article using texturizing process,
the sulfonated reagent being introduced during step a. and/or b, and/or c, in order to provide resistance to phenolic yellowing to the obtained white polyamide article when it is in contact with plastic packaging material containing phenolic compounds, like butylated hydroxytoluene (BHT).

All the preferred embodiments and definitions that are described below for the method can be applied directly the above use according to the invention.

The invention also provides a phenolic yellowing resistant white polyamide article obtained from the method above.

DETAILED DESCRIPTION OF THE INVENTION

Definitions

The expression "plastic packaging material" is understood to mean bags, sachets, caps, cap-covers, bottles, flasks, barrels, labels, wrapping and padding materials, covers, boxes, cases, beakers or pots made of plastics like Polyethylene terephthalate (PETE), High Density Polyethylene (HDPE), Polyvinyl chloride (PVC), Low Density Polyethylene (LDPE), Polypropylene (PP), Polystyrene (PS) and mixtures thereof.

The expression "polyamide article" refers to "polyamide fiber" which is the generic term meaning the raw-material composition of a textile article and which includes staple fibers, filaments and yarns; but also refers to any flock or any textile composition made of polyamide fiber, especially fabrics and/or garments. The term "polyamide article" can also refers to any pellet or powder that can be used to produce extruded, injected or molded articles.

The expression "white polyamide articles" means polyamide articles that appear white to an average viewer under standardized conditions. It is understood to fulfill the requirement below:

A polyamide article is commercially defined as white by those skilled in the art if it shows a whiteness index (WI) of at least 130, measured by the standardized method CIE L*a*b* (standard CIE 15:2004 of the "Commission internationale de l'éclairage"). In this method, the polyamide article is assessed using a spectrophotometer or a colorimeter, and the whiteness index (WI) is measured considering the formula: $WI(D65/10°)=Y+800 (0,3138-x)+1700 (0,3310-y)$, where D65 refers to the illuminant type, $10°$ refers to the observation angle and Y, x and y refer to the chromaticity coordinates. Several other less common methodologies can be used to assess whiteness of polyamide articles, such as Hunter, Berger, Ganz and Stenby methodologies.

According to the present invention, the whiteness of the yellowing-proof polyamide articles is at least 140, measured by the CIE L*a*b* methodology. As a comparison, the whiteness of a greige (name given to polyamide articles that are intended to be dyed) polyamide article is commonly <90, measured by the same methodology.

In the below description, the terms fiber, yarn and filament can be used indifferently without changing the meaning of the invention.

Method for Providing Resistance to Phenolic Yellowing in White Polyamide Articles The present invention relates to a method for providing resistance to phenolic yellowing in white polyamide articles subject to contact with plastic packaging material containing phenolic compounds like butylated hydroxytoluene (BHT), comprising at least the following steps:
 a. Polymerization of at least a monomer to obtain a polyamide in a melt, pellet or powder form,
 b. Formation of the polyamide article from the polyamide melt, pellet or powder,
 c. Optionally conversion of the polyamide article using texturizing process,
wherein a sulfonated reagent is introduced during step a. and/or b. and/or c.

According to the invention, a phenolic compound is defined as a compound that has one or more hydroxyl groups attached directly to an aromatic ring. The phenolic compounds that are contained in the plastic packaging material are for example one or more compounds from the list comprising phenolic acids, acetophenones, phenylacetic acids, cinnamic acids, cinnamyl aldehydes, cinnamyl alcohols, coumarics, isocoumarins, chalcones, aurones, dihydrochalcones, flavans, flavones, flavanones, flavanonols, antrocyanidins, anthocyanins, biflavonyls, benzophenones, xanthones, stilbenes, quinones, betacyanins, tannins, lignin, lignans and phlobaphenes. Preferably the phenolic antioxidant is butylated hydroxytoluene (BHT).

In the method according to the invention, the white polyamide articles that are subject to contact with plastic packaging material containing phenolic compounds like butylated hydroxytoluene (BHT) are also in contact with nitrogen oxides, for example from air pollution, tow motor emissions, and/or gas furnaces.

According to the invention, the polyamide, also known as nylon, can result from two different monomers (AABB type), the most important polyamide of which is poly (hexamethylene adipamide) (polyamide 6.6 or Nylon 6.6). Of course, these polyamides can be obtained from a mixture of diacids and diamines. Thus, in the case of poly(hexamethylene adipamide), the main monomers are hexamethylenediamine and adipic acid. However, these monomers can comprise up to 25 mol % of other diamine or diacid monomers or even amino acid or lactam monomers. The polyamide according to the invention can also result from just one monomer (AB type), the most important polyamide of which is polycaprolactam (or polyamide 6 or Nylon 6). Of course, these polyamides can be obtained from a mixture of lactams and/or amino acids. In the case of polycaprolactam, the main monomer is caprolactam. However, these monomers can comprise up to 25 mol % of other amino acid or lactam monomers or even diamine or diacid monomers. More generally, the polyamide is selected from the group consisting of aliphatic, semi-aromatic and aromatic polyamides, and mixtures thereof. Advantageously, the aliphatic polyamide, which is preferred, is selected from the group consisting of polyamide 6, polyamide 6.6, polyamide 5.6, polyamide 5.10, polyamide 6.12, polyamide 11, polyamide 12, polyamide 10.10, polyamide 4.6 and mixtures thereof. Even more preferably, the polyamide is selected from the group consisting of polyamide 6, polyamide 6.6 and mixtures thereof, preferably polyamide 6.6. Copolymers, blends and bi-component fibers made from polyamide and other polymers are also part of the present invention. A particularly preferred polyamide according to the present invention is a polyamide 6.6 containing from 1 to 5% of caprolactam.

According to the invention, the sulfonated reagent includes functional groups that associate with the free terminal amino groups of the polyamide. Such functional groups belong to the group of sulfonyl groups, preferably a sulfonate functional group with the formula: $R-SO_3$, where the hydrocarbon substituent R can be aliphatic, aromatic or alicyclic, having one or more functional groups like carboxylic acids and derivatives thereof, preferably R is an aromatic substituent with one or more carboxylic acid functional group, or R is an aryl group substituted with at least one $C_3$ to $C_{20}$ alkyl group, such as a $C_8$ to $C_{16}$ alkyl group. The term "alkyl" refers to both straight- and branched-chain saturated aliphatic hydrocarbon groups having at least one carbon atoms, e.g., 1 to 18 carbon atoms.

The sulfonated reagent is advantageously selected from the group consisting of sulfonated aromatic, aliphatic or alicyclic compounds. Preferably, the sulfonated reagent is a sulfonated aromatic acid, salt, anhydride or mixture thereof.

More preferably, the sulfonated reagent is selected from the group consisting of sulfoisophtalic acids, sulfobenzoic acids, sulfosalicylic acid, sulfonic acids, salts thereof, anhydrides thereof, and mixtures thereof.

In one embodiment, the sulfonated reagent is a salt of sulfoisophthalic acid, notably an alkali metal salt of sulfoisophthalic acid. The alkali metal salt is, in this case, selected from the group consisting of Na, Li, K, preferably Na or Li. The best results are obtained in the preferred embodiment wherein the reagent is selected from the group consisting of a sodium salt of 5-sulfoisophthalic acid (AISNa), a lithium salt of 5-sulfoisophthalic acid (AISLi) and/or mixtures thereof.

In another embodiment, the sulfonated reagent is a salt of aryl alkyl sulfonic acid, wherein the alkyl and aryl groups can be optionally substituted by one or more substituents such as halogen, CN, OH, $NO_2$, amino, alkyl, cycloalkyl, alkenyl, alkynyl, alkoxy, aryloxy, substituted alkyloxy, alkylcarbonyl, alkylcarboxy, alkylamino, or arylthio. Preferably, the sulfonated reagent is a salt of aryl alkyl sulfonic acid, wherein the cationic ions include alkali metal cations and alkyl ammonium salts. The salt of aryl alkyl sulfonic acid is most preferably compositions of N,N-bis(2-hydroxyethyl)-N-methyl-(z)-9-Octadecen-1-aminium chloride, benzenesulfonic acid dodecyl-compound with 2-aminoethanol (1:1); benzenesulfonic acid dodecyl-compound with 2,2,2-nitrilotris (ethanol) (1:1); sulfuric acid mono(2-ethoylhexyl) ester, sodium salt; alkylbenzenesulfonic, triethanolamine salt; and combinations thereof.

Commercially available compositions including aryl alkyl sulfonic acid salts are available under the trade names Depicol LG, Stabilon® CT, Ultraphor® AUC-NY, CHT-FASERSCHUTZ RPY SPEZ, Umidol APY liq, Levasalt AY and Rucolan VG1. The commercial product used in the present invention is Stabilon® CT, which is an aqueous solution of aryl alkyl sulfonic acid salts containing: 2.5-5%-N,N-bis(2-hydroxyethyl)-N-methyl-(Z)-9-Octadecen-1-aminium chloride; 20-22%-Benzenesulfonic acid, dodecyl-, compound with 2-aminoethanol (1:1), and 20-30%-Benzenesulfonic acid,dodecyl-, compound, with 2,2',2"-nitrilotris (ethanol)(1:1).

According to the method of the invention, the sulfonated reagent is advantageously introduced in an amount of 0.01 to 5.0%, preferably 0.3 to 2.0% by weight of the total weight of the polyamide article.

Referring back to the method, the method includes a step a. of polymerization of at least a monomer to obtain a polyamide in a melt, pellet or powder form, a step b. of formation of the polyamide article from the polyamide melt, pellet or powder, and optionally a step c. of conversion of the polyamide article using texturizing process.

First Embodiment: Introduction During Step a.

According a first embodiment of the present invention, the introduction of the sulfonated reagent is implemented during step a.

In this first embodiment, the sulfonated reagent may be introduced in an amount of 0.01% to 5.0% by weight of the total weight of the polyamide article, preferably 0.3 to 2.0 wt %. The sulfonated reagent may be added on its own or as a masterbatch. The terminology "masterbatch" is further defined as a concentrate of the sulfonated reagent in a carrier. Any suitable carrier, a compound or a mixture of compounds known in the art, chemically and/or physically compatible with the polyamide, may be employed for the preparation of the masterbatch. The carrier is typically chosen among thermoplastic polymers, organic solvents, oils and water. The masterbatch may include any ratio of the reagent with respect to the carrier, more specifically from 10 to 40 wt % of the reagent in the carrier. In one specific embodiment of the step a., the sulfonated reagent is added as a masterbatch with the use of water as carrier.

The step a. may comprise any process of polymerization known by those skilled in the art, including continuous polymerization and/or batch polymerization. Most preferably the method according to the invention is a batch polymerization.

The polymerization of at least a monomer to obtain a polyamide in a melt, pellet or powder form comprises generally the following steps:
 a0. Preparation and optionally concentration by evaporation of water, of a monomer containing aqueous solution,
 a1. Polymerization, under pressure, of the monomer containing aqueous solution, optionally concentrated,
 a2. Reduction in pressure of the polymerization medium in order to remove the residual water by evaporation,
 a3. Optional maintenance of the polymer temperature, at atmospheric pressure or under reduced pressure, in order to obtain the desired degree of polymerization.
 a4. Recovery of the polyamide as a melt or transformation of the molten polyamide into pellets or powder.

In the first step a0. the concentration is generally carried out in an "evaporator", a device known by the person skilled in the art. It can, for example, be a static evaporator with an internal heat exchanger of coil type, an evaporator with a loop for recirculation through an external exchanger, and the like.

In the case of a polyamide AABB, the monomer containing aqueous solution is an aqueous solution of a salt of diacid (or dicarboxylic acid) and diamine, obtained by mixing at least one diamine and one diacid, advantageously in a stoichiometric amount and in presence of water. In the case of polyamide 66, the monomer containing aqueous solution is a nylon salt solution obtained by mixing adipic acid, hexamethylene diamine and water.

In the case of a polyamide AB, the monomer containing aqueous solution is obtained by mixing a lactam and/or an amino acid with a small amount of water. The proportion by weight of water is generally between 1 and 15%. Then, the evaporation of water in this case is not compulsory.

In a preferred embodiment, the diacid monomer is selected from the group consisting of adipic, glutaric, suberic, sebacic, dodecanedioic, 1,2- or 1,3-cyclohexanedicarboxylic acid, 1,2- or 1,3-phenylenediacetic acid, 1,2- or 1,3-cyclohexanediacetic acid isophthalic, p-(tert-butyl) isophthalic acid, terephthalic, azelaic, pimelic, 4,4'-benzophenonedicarboxylic acid; 2,5-naphthalenedicarboxylic or 5-sulphoisophthalic acid or alkaline salt thereof, and/or mixtures thereof. The preferred dicarboxylic acid is adipic acid.

In a preferred embodiment, the diamine monomer is selected from the group consisting of hexamethylenediamine, heptamethylenediamine, tetramethylenediamine, pentamethylenediamine, octamethylenediamine, nonamethylenediamine, decamethylenediamine, 2-methylpentamethylenediamine, undecamethylenediamine, dodecamethylenediamine, xylylenediamine or isophoronediamine ; 2-methylhexamethylenediamine; 3-methylhexamethylenediamine; 2,5-dimethylhexamethylenediamine; 2,2-dimethylpentamethylenediamine; 5-methylnonanediamine; 2,2,4- and 2,4,4-trimethylhexamethylenediamine; 2,2,7,7-tetramethyloctamethylenediamine; meta-xylylenediamine; para-xylylenediamine; diaminodicyclo-hexylmethane and C2-C16 aliphatic diamines which can be substituted by one or more alkyl groups, and/or mixtures thereof. The preferred diamine is hexamethylenediamine.

The lactam or amino acid monomers can, for example, be chosen from caprolactam, 6-aminohexanoic acid; 5-aminopentanoic acid, 7-aminoheptanoic acid, 11 aminoundecanoic acid or dodecanolactam, and mixtures thereof. The preferred lactam is caprolactam.

Next, in the second step a1., the concentrated aqueous solution is transferred to an autoclave, followed by a pressure increase. It reaches the final concentration of the concentrated aqueous solution, typically nylon salt, and promotes the start of the polymerization, under a pressure advantageously regulated between 1.5 and 2.5 MPa.

In the third step a2., the reduction in pressure consists of a decompression of the polymerization medium in order to remove the residual water by evaporation.

Then, according to step a3., the polyamide can subsequently be kept for a predetermined time at a polymerization temperature, and at atmospheric pressure or under reduced pressure in order to obtain the desired degree of polymerization, homogeneity and viscosity. Step a3. is referred to as finishing.

Lastly, in step a4., the polyamide is recovered as a melt or is transformed into pellets or powder.

The transformation into pellets is well known by the skilled person in the art. It generally consists in extruding the melt polyamide and granulating it.

The transformation into a powder is also a known technique. It generally consists of solvent dispersion, emulsion polymerization and precipitation techniques.

These stages are known by the person skilled in the art and are those used in conventional industrial processes for the manufacture of polyamide from an aqueous solution of salt of diacid and diamine.

In this first embodiment wherein the sulfonated reagent is introduced during step a., it is preferred that the sulfonated reagent is introduced at the beginning of step a1., notably that a masterbatch containing the sulfonated reagent is introduced into the autoclave at the beginning of step a1. of the polymerization. The polyamide is thus polymerized in the presence of the sulfonated reagent, producing yellowing-proof polyamide articles.

According to this first embodiment, after step a., step b. of formation of the polyamide article from the obtained polyamide melt, pellet or powder is carried out.

This step b. is further described below in the second embodiment; it generally comprises a melt-spinning extrusion step in order to form first a polyamide fiber. This polyamide fiber can then be transformed into another polyamide article as described above, notably a textile fabric and/or garment. The methods for transforming the polyamide fiber into a polyamide article like a textile fabric or garment are well known by the skilled person in the art.

Second Embodiment: Introduction During Step b

According to a second embodiment of the present invention, the introduction of the sulfonated reagent is implemented during step b. of formation of the polyamide article from the polyamide melt, pellet or powder.

Step b. of formation of the polyamide article from the polyamide melt, pellet or powder, generally comprises a melt-spinning extrusion step in order to form first a polyamide fiber. This polyamide fiber can then be transformed into another polyamide article as described above, notably a textile fabric and/or garment. The methods for transforming the polyamide fiber into a polyamide article like a textile fabric or garment are well known by the skilled person in the art.

In this second embodiment, the sulfonated reagent may be introduced in an amount of 0.01% to 5.0% by weight of the total polyamide article, preferably, 0.3 to 2.0 wt %. The sulfonated reagent may be added on its own or as a masterbatch. The definition of masterbatch in this embodiment is the same as given above. In this particular embodiment, the sulfonated reagent is advantageously introduced as a masterbatch in a polyamide 6 or 66 carrier, preferably a polyamide 6 carrier.

According to the invention the expression "melt-spinning" is understood to mean the extrusion process of converting the polyamide in a melt form into polyamide fibers. The polyamide in the melt form can be the polyamide melt directly obtained from step a. described above or can be produced by melt extrusion of the pellets or powder obtained at the end of step a. directly or after storage and/or transportation.

The polyamide obtained in step a. may be fed to the melt-spinning device in pellet, powder or melt form. Any conventional extrusion spinning means suitable for melt-spinning extrusion of polyamide, these means being well known by a person skilled in the art, may be used to form the polyamide article from the polyamide resulting from step a., such as single-screw extruder, double-screw extruder and grid spinning head. The melt-spinning extrusion is further defined as being LOY (low-oriented yarn), POY (partially oriented yarn), FDY (fully drawn yarn), FOY (fully oriented yarn), LDI (Low denier Industrial) or HDI (High denier Industrial).

The melt spinning extrusion usually comprises the following steps:
b0. Feeding the polyamide melt, pellet or powder into the inlet of a screw extruder or grid spinning head,
b1. Melting, homogenizing and pressurizing the polyamide,
b2. Spinning the molten polyamide into filaments,
b3. Cooling down the filaments.

In the first step b0., the polyamide melt, pellet or powder is added into the inlet of a screw extruder or grid spinning head, a device known by the person skilled in the art.

Next, in the second step b1, the polyamide is melted, homogenized and pressurized inside the screw extruder or grid spinning head, at a specified temperature and pressure, which is usually above the melting temperature of the polyamide.

Then, according to step b2, the molten polyamide is spun into filaments at a specific pressure, temperature and flow rate, with the use of a spinning screen-pack containing filtering elements and a spinneret.

Step b3. is referred to the cooling down the filaments until the solidified form and winding the polyamide filaments into bobbins.

Optionally, the extruder may be equipped with a metering system for introducing additives such as masterbatches into the main polymer, at step b0. and/or b1.

In this second embodiment, the sulfonated reagent is preferably continuously introduced during step b0. It can be added as a powder, liquid masterbatch or solid masterbatch, by means of a dosing pump or gravimetric feeding apparatus. The sulfonated reagent is melt-mixed with the molten polyamide, before the formation of the fiber. Any suitable carrier compatible with the polyamide may be employed for the preparation of the masterbatch. The masterbatch may include any ratio of the sulfonated reagent with respect to the carrier, more specifically from 10 to 40% of the sulfonated reagent in the carrier. In this particular embodiment, the sulfonated reagent is advantageously introduced as a masterbatch in a polyamide 6 or 66 carrier, preferably a polyamide 6 carrier.

In one particular embodiment of this second embodiment, the sulfonated reagent is advantageously continuously added to step b0. of the grid spinning head as a liquid masterbatch, by means of a dosing pump. The masterbatch is previously produced by mixing the carrier, which is preferably water, with the sulfonated reagent.

In another particular embodiment of this second embodiment, the sulfonated reagent is continuously added to step b0. of the single-screw extruder as a solid masterbatch, by means of a feeding apparatus. The masterbatch is previously produced by mixing the carrier, which is preferably polyamide 6.6, with the sulfonated reagent using a compounding extrusion process. The masterbatch is introduced to the step b1. in a granulated form.

Third Embodiment: Introduction During Step a and b

According to a third embodiment of the present invention, the introduction of the sulfonated reagent is implemented during both step a. and step b.

In this third embodiment, the total quantity of sulfonated reagent introduced is from 0.01% to 5.0% by weight of the total polyamide article, preferably from 0.3 to 2.0 wt %. The sulfonated reagent may be added on its own or as a masterbatch.

Advantageously, at step a, from 0.005 to 2.5 wt % is added and at step b. from 0.005 to 2.5 wt % is also added.

Each introduction at each step (a. and b.) can be performed according to the description above.

Fourth Embodiment: Introduction During Step c.

According to the fourth embodiment of the present invention, the polyamide fiber is converted by using texturizing process. This process comprises any technology known by those skilled in the art such as false-twist texturizing, false-twist—fixed texturizing and air-jet texturizing. Most preferably false-twist texturing.

The method can include the following steps:
c1. The fiber is removed from the package and passes to the delivery rolls.
c2. The fiber passes through a heater, then to a cold zone.
c3. The fiber passes through a spindle containing rotating discs (friction aggregates)
c4. intermingling points and coning oil are applied to the fiber.
c5. The fiber is wound into bobins.

Wherein a drawing ratio is given to the fiber by altering the speed ratio of the c1 and c5.

Wherein a special coning oil is used during step c4.

In step c1, the fiber is advantageously placed in a creel and is unwound from the bobbins to the delivery roll. Step c2 preferably involves passing the fiber inside a heater, with temperature from 120° C. to 400° C., in order to assist the mechanical action of stretching and twisting the fibers by softening (making more malleable). The fiber is then cooled.

Step c3 is where the twist, volume, crimp and texture are generated in the fiber. The amount of twist is changed by altering the speed of the discs, discs arrangement and the D/Y relationship. The D/Y ratio changes the ratio of speeds between the friction discs and the linear speed of the fiber. This ratio is preferably from 1.0 to 2.8. The disc arrangement is advantageously from 1/2/1 to 1/8/1, being guide disc/work disc/guide disc.

According to step c4, intermingling points and coning oil are applied to the fiber. The intermingling improves physical and aesthetic features and are preferably at least 30 interlaces per meter. The coning oil provides lubrication. A special coning oil is used in the present invention, it consists of a mixture of sulfonated reagent, mineral or synthetic oils and surfactants. The sulfonated reagent is present in an amount from 10 to 30% wt, the oils from 60 to 80% wt, and the surfactants from 5 to 15% wt by weight of the coning oil total formulation. The sulfonated reagent is applied topically to the fiber as coning oil during step c4 by any method known by those skilled in the art, such as oiling guides or rollers. The coning oil may additionally comprise further compositions such as, stabilizers, antioxidants, softeners, finishes, anti-static agents, functional additives, rheology modifiers, emulsifier, corrosion inhibitor, antisplash and combinations thereof.

Step c5. is the winding process, where the fiber is wound into bobbins; the winding speed can vary from 150 m/min to 1500 m/min.

The drawing ratio is given to the fiber by altering the speed ratio of step c1 and step c5, and is an important parameter of the process for achieving the desired linear density. The drawing ratio is advantageously from 1.10 to 4.00. Yarns of more than 1 ply is possible, such as from 1 to 8 plies.

Fifth Embodiment: Introduction During Step a and c.

According to the fifth embodiment of the present invention, the introduction of the sulfonated reagent is implemented during both step a. and step c.

In this fifth embodiment, the total quantity of sulfonated reagent introduced is from 0.01% to 5.0% by weight of the total polyamide article, preferably from 0.3 to 2.0 wt %. The sulfonated reagent may be added on its own or as a masterbatch, or as a coning oil.

Advantageously, at step a, from 0.005 to 2.5 wt % is added and at step c. from 0.005 to 2.5 wt % is also added.

Each introduction at each step (a. and c.) can be performed according to the descriptions above.

Additives can be introduced during the method of the invention. The additives are selected from: antioxidants, stabilizers such as heat or light stabilizers, colorants, pigments, nucleating agents such as talc, matifying agents such as titanium dioxide or zinc sulphide, processing aids, biocides, viscosity modifiers, catalysts, FIR emitting minerals, biodegradable "converting" additives, anti-static additives, functional additives, optical brightening agents, nanocapsules, anti-bacterial, anti-mite, anti-fungi or other conventional additives. These additives are generally added at step a0 and/or a1 and/or b0 and/or b3, in an amount of 0.001% to 10% by weight of the polyamide article.

The polyamide article may be any known in the art. In one embodiment, the article is a fiber (staple fiber), a yarn, a filament or a flock or a textile article made from said fiber, yarn or filament. The textile article may be any textile article known in the art including, but not limited to woven fabric, knitted fabric, nonwoven fabric, ropes, cords, sewing thread, and so forth.

These articles are subsequently used in a large number of applications, in particular in carpets, rugs, upholstery, parachutes, tents, bags, hosiery, underwear, sportswear, outerwear and so on.

Other details or advantages of the invention will become more clearly apparent in the light of the examples given below.

EXAMPLES

A series of polyamide articles (Examples 1, 2, 3, 4, 7 and 8), a comparative polyamide article (Example 5 and 6) and a control polyamide article (Example 9) are formed and evaluated to determine phenolic yellowing, terminal amino group content (AEG) and solution viscosity (IVN).

Phenolic Yellowing

Knitted fabrics were produced from the different polyamide articles and submitted to the Courtalds test ISO 105-X18:2007 "Assessment of the potential to phenolic yellowing of materials". In this method, the fabric samples are placed inside a folded paper containing 2,6-di-tert-butyl-4nitrofenol (DTNP), wrapped in a plastic film not containing BHT (butyl hydroxytoluene) and introduced inside an oven for 16 hours at 50° C. The phenolic yellowing was assessed visually or instrumentally using a spectrometer. The result is given in a scale of 1 to 5 (1 being poor and 5 being excellent).

Amino End Group Content

The amino end group (AEG) content was determined by a potentiometric titration method. The quantity of 2 grams of polyamide is added to about 70 ml of phenol 90%. The mixture is kept under agitation and temperature of 40° C. until complete dissolution of the polyamide. The solution is then titrated by 0.1N HCl at about 25° C. The result is reported as equivalent/ton (eq/ton). In the case of analyzing fibers and articles, any residue or spin-finish must be previously removed.

Solution Viscosity (IVN)

The determination of the solution viscosity (IVN) is performed according to ISO 307. The polyamide is dissolved in formic acid 90% at 25° C. at a concentration of 0.005g/ml, and its flow time is measured. The result is reported as ml/g.

Example 1

A solution containing 28 kg of demineralized water and 10 kg of the AISNa is added to 1250 kg of polyamide during the step a1. of the polymerization, and an optical brightening additive is continuously added as a liquid masterbatch to the top of the grid spinning head, via a pump. The AISNA is introduced into the autoclave, at the beginning of the polymerization. The resulting yellowing-proof PA 66 pellet contains 0.8 wt % of the reagent, AEG 30.7 eq/t and IVN 110.5. A yellowing-proof PA 66 multi-filament yarn is produced with said yellowing-proof PA 66 pellets and 0.4 wt % of an optical brightening additive, during melt-spinning extrusion.

The yellowing-proof PA 66 multi-filament yarn is further texturized into linear density of 2×78 dtex and knitted into fabric.

The yellowing-proof PA 66 knitted fabric showed good anti-phenolic yellowing properties.

Example 2

A liquid masterbatch containing 29.4 wt % of the AISNa, 58.9 wt % of demineralized water and 11.7 wt % of an optical brightening additive is continuously added to step b0., at the top of the grid spinning head, via a liquid pump, at a melt-spinning temperature of about 290° C. The resulting yellowing-proof PA 66 multi-filament contains 1.0 wt % of the reagent AISNa, 0.4 wt % of optical brightening additive, AEG 35.6 eq/t and IVN 107.2. The yellowing-proof PA 66 multi-filament yarn is further texturized into linear density of 2×78 dtex and knitted into fabric.

The yellowing-proof PA 66 knitted fabric showed good anti-phenolic yellowing properties.

Example 3

A liquid masterbatch containing 38.5 wt % of the AISNa, 51.2 wt % of demineralized water and 10.3 wt % of an optical brightening additive is continuously added to step b0., at the top of the grid spinning head, via a liquid pump, at a melt-spinning temperature of about 290° C. The resulting yellowing-proof PA 66 multi-filament contains 1.5 wt % of the reagent AISNa, 0.4 wt % of optical brightening additive, AEG 36.9 eq/t and IVN 103.7. The yellowing-proof PA 66 multi-filament yarn is further texturized into linear density of 2×78 dtex and knitted into fabric.

The yellowing-proof PA 66 knitted fabric showed very good anti-phenolic yellowing properties.

Example 4

Yellowing-proof polyamide pellet is produced according to example 1. An additional quantity of 0.5 wt % of AISNa is added to the extrusion step as follows: a solid masterbatch containing 20 wt % of the AISNa and 80 wt % of polyamide 6.6 is combined with another solid masterbatch containing 10 wt % of an optical brightening additive. The solid masterbatch is previously produced by mixing the carrier, which is polyamide 6.6, with the AISNa using a compounding extrusion process. The produced masterbatch is continuously added to the step b0. of the single-screw extruder in a granulated form, via a feeding apparatus, at a melt-spinning temperature of about 270° C.

The resulting yellowing-proof PA 66 multi-filament contains 1.3 wt % of AISNa, 0.4 wt % of optical brightening additive, AEG 33.19 eq/t and IVN 98.04. The yellowing-proof PA 66 multi-filament yarn is further texturized into linear density of 2×78 dtex and knitted into fabric.

The yellowing-proof PA 66 knitted fabric showed very good anti-phenolic yellowing properties.

Example 5

Comparative

A liquid masterbatch containing 17.2 wt % of adipic acid, 69.0 wt % of demineralized water and 13.8 wt % of an optical brightening additive is continuously added to step b0., at the top of the grid spinning head, via a liquid pump, at the melt-spinning temperature of about 290° C. The resulting yellowing-proof PA 66 multi-filament contains 0.5 wt % of adipic acid, 0.4 wt % of optical brightening additive, AEG 29.3 eq/t and IVN 100.7. The yellowing-proof PA 66 multi-filament yarn is further texturized into linear density of 2×78 dtex and knitted into fabric. The yellowing-proof PA 66 knitted fabric showed good anti-phenolic yellowing properties.

Example 6

Comparative

A liquid masterbatch containing 23.8 wt % of adipic acid, 63.5 wt % of demineralized water and 12.7 wt % of an optical brightening additive is continuously added to step b0., at the top of the grid spinning head, via a liquid pump, at the melt-spinning temperature of about 290° C. The resulting yellowing-proof PA 66 multi-filament contains 0.75 wt % of adipic acid, 0.4 wt % of optical brightening additive, AEG 8.2 eq/t and IVN 74.5. The winding of the yellowing-proof PA 66 multi-filament yarn was not possible due to the low viscosity and very poor processability; hence it was not possible to be evaluated.

Example 7

A conventional PA 66 multi-filament yarn, without any previous sulfonated reagent, but with optical brightening, was converted into textured PA 66 multi-filament of 2×78 dtex, by a texturizing process. A special coning oil was applied to the yarn during step c4. The coning oil consists of a mixture of sulfonated reagent (Stabilon® CT), oils and surfactants. More specifically, the sulfonated reagent represents 18% wt, the oil 71.4% wt and the surfactant 10.6% wt by weight of the coning oil formulation. The coning oil is applied to the yarn by using a dosing pump and rollers.

The resulting yellowing-proof PA 66 multi-filament contains 1.0 wt % of sulfonated reagent, 0.4 wt % of optical brightening additive, ? eq/t and IVN ?. The yellowing-proof PA 66 multi-filament yarn is further knitted into fabric.

The yellowing-proof PA 66 knitted fabric, showed very good anti-phenolic yellowing properties.

Example 8

A PA 66 multi-filament yarn, produced at step a according to example 1 above, with 0.9% of AlSNa, and optical brightening, was converted into textured PA 66 multi-filament of 2×78 dtex, with the use of a texturizing process. A special coning oil was applied to the yarn according to example 7 above during step c4. The quantity of Stabilon® CT applied during step c4is 1.0%.

The resulting yellowing-proof PA 66 multi-filament contains a total of 1.9 wt % of anti-yellowing additives, 0.4 wt % of optical brightening additive, AEG ? eq/t and IVN ?. The yellowing-proof PA 66 multi-filament yarn is further knitted into fabric.

The yellowing-proof PA 66 knitted fabric showed excellent anti-phenolic yellowing properties.

Example 9

Control

A conventional texturized PA 66 multi-filament yarn of 2×78 dtex of linear density was produced with the same characteristics as the yarns mentioned above, however without the reagent (but with 0.4 wt % of optical brightening additive). The results of the knitted fabric produced therefrom are AEG 36.8 eq/t, IVN 124.0.

Evaluation of the Examples:

As described above, each of the examples (Examples 1, 2, 3, 4, 5, 6, 7, 8 and 9) are evaluated to determine phenolic yellowing, amino end group content (AEG) and solution viscosity (IVN). The results of each of these examples tested are showed in Table 1 below.

The results of the Phenolic Yellowing tests show that the Example 3, 4, 7 and 8 achieved the best yellowing-proof property. For instance, example 8 achieved grade "5.0" and example 4 achieved grade "4.0", whereas comparative examples achieved lower grades (comparative example 7 (1.0)) or cannot be measured (comparative example 6).

From the examples, it is possible to conclude that when the AlSNa is added during the polymerization step (example 1 and 4) the polyamide article achieves good yellowing-proof effect with lower content of the AlSNa. For instance, example 1 (0.8 wt %) showed better yellowing-proof effect than example 2 (1.0 wt %); and example 4 (1.3 wt %) showed better yellowing-proof effect than example 3 (1.5 wt %). The best result is achieved by combining the polymerization step with the texturizing step. During the texturizing step, the sulfonated reagent is applied topically, what significantly enhances the anti-yellowing protection while maintaining the mechanical and physical properties.

Regarding the processability and viscosity, Example 1 showed the highest IVN (110.5), which means the intrinsic viscosity and processability was less affected than the other examples, particularly the comparative examples 5 and 6, where the processability was impaired due to the lower IVN, respectively 100.7 and 74.5. Example 4 and comparative example 5 showed very close viscosities, however, the processability of the example 4 was better than comparative example 5. A sharp reduction of IVN is detrimental to the melt-spinning process and mechanical properties of the yarn, for instance, comparative example 6 showed poor processing conditions due to the very low IVN (74.5), which means it was not possible to spin and wind the polyamide into bobbins as the fiber did not reach the minimum mechanical requirements.

In summary, when the sulfonated reagents are introduced at a quantity of 1.3, 1.5 and 1.9 wt %, it is possible to obtain very good yellowing-proof results with a very good processability. At 1.0 and 0.8 wt % with AlSNa, it is still possible to obtain good yellowing-proof results with no processability issues. Therefore, the AlSNa and aryl alkyl sulfonic acid salts are less detrimental to the process and to the viscosity than the carboxylic acid (e.g. adipic acid) of comparative examples 5 and 6, and also show better yellowing-proof effect.

The invention claimed is:

1. A method for providing resistance to phenolic yellowing in white polyamide articles subject to contact with plastic packaging material containing at least a phenolic compound, comprising at least the following steps:

TABLE 1

| | Method | Reagent | Wt % | AEG (eq/t) | IVN (ml/g) | Phenolic yellowing | Process-ability | Whiteness |
|---|---|---|---|---|---|---|---|---|
| Example 1 | Polymerization | AlSNa | 0.80 | 30.7 | 110.5 | Good (3.0) | Good | 145 ± 5 |
| Example 2 | Extrusion | AlSNa | 1.00 | 35.6 | 107.2 | Good (2.5) | Good | 145 ± 5 |
| Example 3 | Extrusion | AlSNa | 1.50 | 36.9 | 103.7 | Very good (3.5) | Good | 145 ± 5 |
| Example 4 | Polymerization + Extrusion | AlSNa | 1.30 | 33.19 | 98.04 | Very good (4.0) | Good | 145 ± 5 |
| Example 5 Comparative | Extrusion | Adipic Acid | 0.50 | 29.3 | 100.7 | Good (3.0) | Poor | 145 ± 5 |
| Example 6 Comparative | Extrusion | Adipic acid | 0.75 | 8.2 | 74.5 | NA | Very Poor | 145 ± 5 |
| Example 7 | Texturization | Stabilon CT | 1.00 | ? | ? | Very good (3.5) | Good | 145 ± 5 |
| Example 8 | Polymerization + Texturization | AlSNa + Stabilon CT | 1.90 | ? | ? | Excellent (5.0) | Good | 145 ± 5 |
| Example 9 Control | NA | NA | NA | 36.8 | 124.0 | Poor (1.0) | Good | 145 ± 5 | a. polymerizing at least a monomer to obtain a polyamide in a melt, pellet or powder form,
b. forming the polyamide article from the polyamide melt, pellet or powder,
c. optionally, texturizing the polyamide article, and introducing a sulfonated reagent during step a and/or b and/or step c.

2. A method according to claim 1, wherein the polyamide is selected from the group consisting of aliphatic, semi-aromatic, aromatic polyamides and mixtures thereof.

3. A method according to claim 1, wherein the polyamide is an aliphatic polyamide selected from the group consisting of polyamide 6, polyamide 6.6, polyamide 5.6, polyamide 5.10, polyamide 6.12, polyamide 11, polyamide 12, polyamide 10.10, polyamide 4.6 and mixtures thereof.

4. A method according to claim 1, wherein the polyamide is selected from the group consisting of polyamide 6.6, polyamide 6 and mixtures thereof.

5. A method according to claim 1, wherein the sulfonated reagent is selected from the group consisting of sulfonated aromatic, aliphatic or alicyclic compounds.

6. A method according to claim 1, wherein the sulfonated reagent is selected from the group consisting of sulfoisophtalic acids, sulfobenzoic acids, sulfosalicylic acid, sulfonic acids, salts thereof, anhydrides thereof, and mixtures thereof.

7. A method according to claim 1, wherein the sulfonated reagent is an alkali metal salt of sulfoisophthalic acid or an aryl alkyl sulfonic acid salt.

8. A method according to claim 1, wherein the sulfonated reagent is the sodium salt of 5-sulfoisophtalic acid or lithium salt of 5-sulfoisophthalic acid or a mixture thereof.

9. A method according to claim 1, wherein the sulfonated reagent is introduced in an amount of 0.01 to 5.0% by weight of the total weight of the polyamide article.

10. A method according to claim 1, wherein step a comprises the following steps:
a0. preparing and, optionally, concentrating by evaporation of water, a polymerization medium comprising a monomer containing aqueous solution,
a1. polymerizing, under pressure, the monomer, of the optionally concentrated polymerization medium to form the polyamide,
a2. reducing pressure of the polymerization medium in order to remove residual water by evaporation,
a3. optionally, maintaining the polyamide at a temperature and at atmospheric pressure or under reduced pressure, in order to obtain the desired degree of polymerization, and
a4. recovering the polyamide as a melt or transformation of the molten polyamide into pellets or powder.

11. A method according to claim 10, wherein the sulfonated reagent is introduced at the beginning of step a1.

12. A method according to claim 1, wherein step b is a melt spinning extrusion step.

13. A method according to claim 1, wherein step b is a melt-spinning extrusion step comprising the following steps:
b0. feeding the polyamide melt, pellet or powder into the inlet of a screw extruder or grid spinning head,
b1. melting, homogenizing and pressurizing the polyamide,
b2. spinning the molten polyamide into filaments,
b3. cooling down the filaments.

14. A method according to claim 13, wherein the sulfonated reagent is introduced during step b0.

15. A method according to claim 1, wherein step c is performed and the sulfonated reagent is introduced during both step a and step c.

16. A method according to claim 1, wherein the polyamide article is a fiber, a yarn or a filament, a flock or a textile article made from a fiber, yarn or filament.

17. A method according to claim 1, wherein the phenolic compound is butylated hydroxytoluene.

18. A process for producing a white polyamide article that comprises at least the following steps:
a. polymerizing at least a monomer to obtain a polyamide in a melt, pellet or powder form,
b. forming the polyamide article from the polyamide melt, pellet or powder,
c. optionally converting the polyamide article using texturizing process, and
d. introducing the sulfonated reagent during step a and/or step b and/or step c, in order to provide resistance to phenolic yellowing to the obtained white polyamide article when it is in contact with plastic packaging material containing phenolic compounds.

19. A phenolic yellowing resistant white polyamide article obtained from the method according to claim 1.

20. A method according to claim 1, wherein the sulfonated reagent is introduced in an amount of 0.3 to 2.0% by weight of the total weight of the polyamide article.

* * * * *